Dec. 10, 1963  E. JONES ETAL  3,113,872
METHOD OF TREATING SHELLED EGGS
Filed Jan. 26, 1960  2 Sheets-Sheet 2
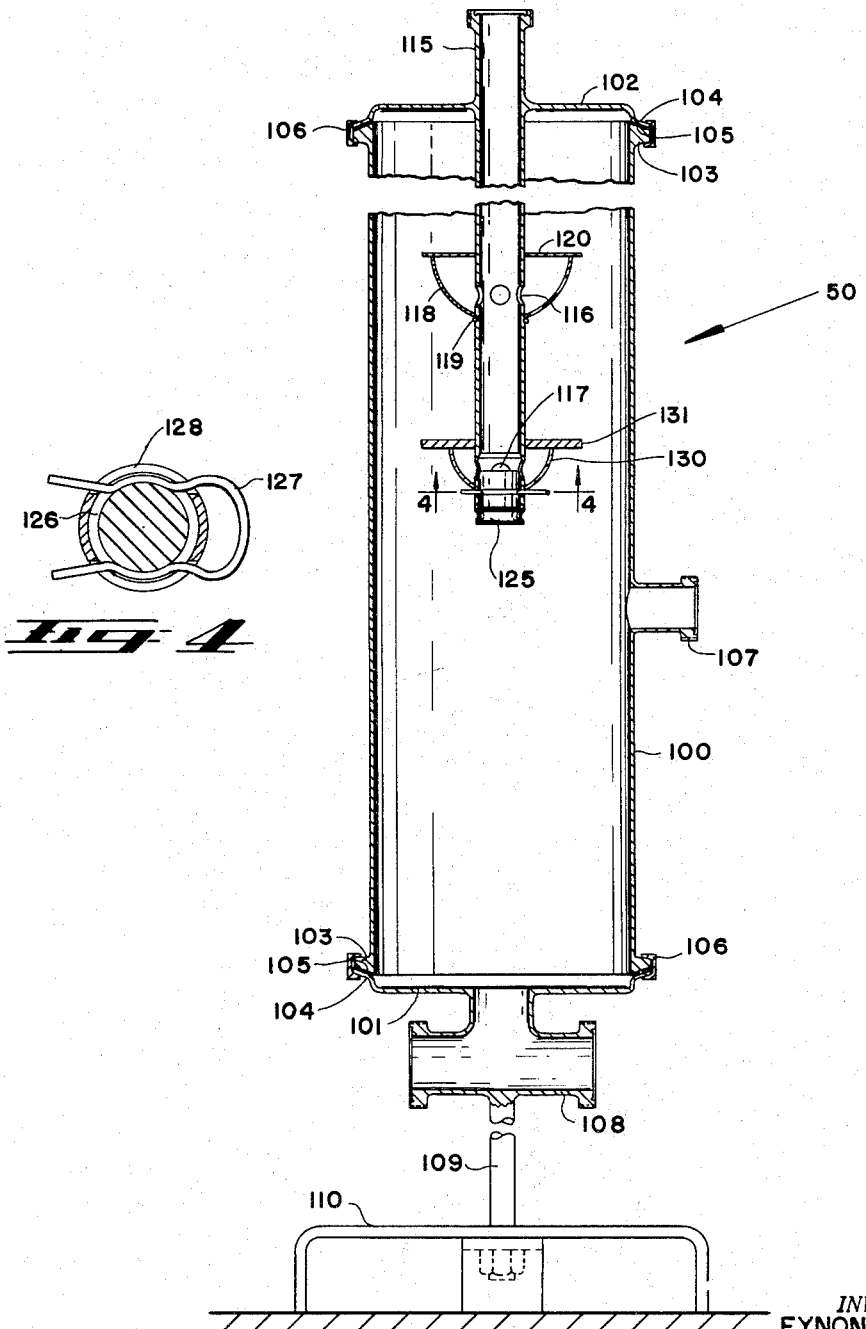
INVENTORS
EYNON JONES
ALBERT R. JOHNSON
BY
ATTORNEY United States Patent Office 3,113,872
Patented Dec. 10, 1963

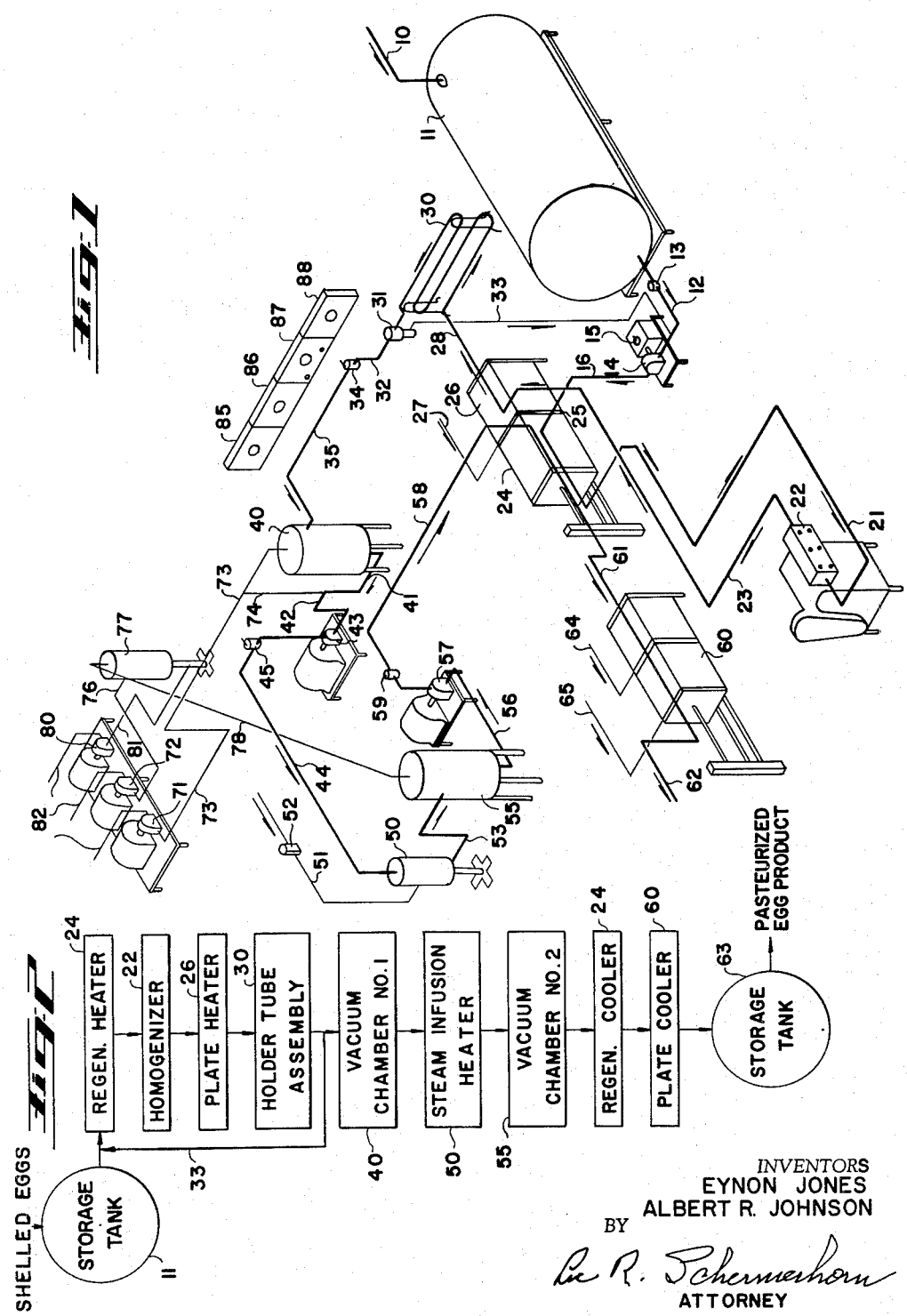

3,113,872
METHOD OF TREATING SHELLED EGGS
Eynon Jones, Perry, and Albert R. Johnson, Cedar Falls, Iowa, assignors, by direct and mesne assignments, to Prep Foods, Inc., Chicago, Ill., a corporation of Delaware
Filed Jan. 26, 1960, Ser. No. 4,640
5 Claims. (Cl. 99—161)

This invention relates to the treatment of shelled eggs for the purpose of enhancing their keeping qualities and removing objectionable flavors and odors and has particular reference to a novel and improved method of applying pasteurizing heat and certain preliminary treatment to enable the egg material to withstand a pasteurizing temperature without coagulation or denaturation.

It is well known that nearly all fresh eggs are contaminated with pathogenic organisms and undesirable bacteria. For the most part, such organisms and bacteria are deposited on the outside of the shell after the egg has been laid, the warm, moist shell constituting a favorable medium for growth. These micro-organisms and bacteria not only readily penetrate through the pores of the shell and enter into the egg material within but also further contaminate the eggs when the latter are broken out of their shells and remain in the egg material through the usual commercial processes, such as cold storage, freezing or drying. Development and growth proceed rapidly upon warming, thawing or the addition of moisture, as the case may be, the egg meats themselves constituting an excellent medium for bacterial growth.

The reduction of bacterial contamination to a relatively low level is highly desirable for the protection of the ultimate consumer and to retard spoilage before the eggs reach the ultimate consumer, as well as for the preservation of the flavor. Eggs are frequently eaten in an uncooked state as in eggnogs, and, even when eaten in the cooked state, all parts of the egg material may not have been subjected to sufficient heat for a sufficient period of time in the cooking process to make them edible. In the commercial usage of eggs as in the manufacture of pastry, pies, custards, mayonnaise and the like, spoilage presents a very serious problem.

A commercially practicable method to prevent such spoilage and wastage has long been sought without success. Various processes have been proposed for pasteurizing eggs but all such processes heretofore known have some disadvantage or objection making them unsuitable for general use. Generally speaking, such processes employ additives of one kind or another which are objectionable for most purposes. For example, hydrogen peroxide combined with a catalase enzyme is effective for certain purposes but an additive of this nature is limited in its use and is not generally accepted by the industry except in the drying field.

It has also been proposed to add certain carbohydrates or allied materials in order to raise the coagulating temperature of the albumen to a point where pasteurization may be effected. It has generally been found impossible heretofore to pasteurize eggs effectively by heat without such an additive unless the product is canned and sold in a partially cooked state. This will be readily appreciated from the fact that egg albumen in mixed whites and yolks normally begin to coagulate at a temperature of 143° F., whereas considerably higher temperatures are necessary to kill all pathogenic organisms and undesirable bacteria in a short period of treatment. Coagulation of the whites alone is a progressive phenomenon depending on the duration of exposure to any particular temperature. Given sufficient time, whites will coagulate at a temperature as low as 128° F., but 140° F. is generally considered the coagulation point in normal heating as in cooking, while in a very brief exposure the temperature is somewhat over 145° F.

Attempts have also been made heretofore to improve the keeping properties of shelled eggs without additives by a two-step heat treatment process involving a brief flash heating step followed by a more prolonged vat pasteurization step. The effectiveness of such a process is limited, however, to the killing of only certain bacteria because the temperature cannot be elevated sufficiently nor the time of exposure to such temperature extended sufficiently to kill substantially all pathogenic organisms in eggs. In order to avoid coagulation of the albumen, the temperature and treatment time must be limited to values which prevent the process from being effective and acceptable for commercial use. Even then, trouble is experienced by the tendency of the egg material to stick on the metallic heating surfaces of the flash heater and the vat. Reducing the temperature and extending the holding time to overcome such difficulty renders the process too slow and too ineffective to be useful commercially. As a result of these various disadvantages this two-step process has not been commercially successful and has not come to be recognized as a practical solution to the problem.

The present invention is also concerned with another shortcoming of eggs as a human food. This is the presence in many eggs of objectionable flavor characteristics derived from the feed eaten by the fowls. Fish and meat meals are particularly objectionable in certain seasons when they are employed in large quantities as a dietary supplement for fowls. Also, alfalfa and natural forage often contribute importantly to the occurrence of objectionable flavors and odors in the eggs. Bacteria, too, affect the flavor. Objectionable flavors and odors are considered in the same category since the two are so closely associated and are, for all practical purposes, indistinguishable to the ordinary person while eating food.

The general object of the present invention is, therefore, to provide an improved treatment for enhancing the keeping properties of eggs, removing objectionable flavor characteristics and while accomplishing these improvements, preventing denaturation of the proteins in the product.

Another object is to provide an improved treatment for eggs to so reduce the number and reproductive ability of the bacteria that the eggs may be stored without an increase in bacteria count to an objectionable level.

Another object is to provide more effective pasteurization of shelled eggs without denaturation of the product.

Another object is to provide a method of pasteurizing eggs without coagulating the albumen and without the use of additives to prevent coagulation.

Another object is to provide a novel combination and sequence of treatment steps to prevent coagulation of the albumen at pasteurizing temperatures.

Another object is to provide an improved process for pasteurizing eggs which is of universal application to shelled whole eggs, egg yolks or whites, to be shipped or stored in liquid bulk form under refrigeration, frozen, partially frozen, or dried, for all purposes for which such eggs are normally used.

Another object is to provide a continuous process for the purpose stated which is fast and economical and does not require elaborate apparatus that is not available to the food industry.

Another object is to provide a novel and improved arrangement of apparatus and plant equipment for pasteurizing eggs.

The foregoing and other objects and advantages will become apparent and the invention will be better understood from the following detailed description of the process in connection with the accompanying drawing. Various changes may be made in the details described herein, however, and certain features may be used without others, all such modifications within the scope of the appended claims being included in the invention.

In the drawing:

FIGURE 1 is a perspective view in the nature of a schematic diagram of a treatment plant for carrying out the process of the invention;

FIGURE 2 is a flow chart of the steps of the process in terms of the principal equipment components shown in FIGURE 1;

FIGURE 3 is a longitudinal sectional view of the steam infusion chamber shown in FIGURE 1; and FIGURE 4 is a sectional view taken on the line 4—4 of FIGURE 3.

The present novel pasteurizing process rests upon the discovery that additives are not necessary to raise the coagulating temperature of albumen if the egg material is first reduced to a state of fine dispersion and the maximum pasteurizing temperature is not applied by hot metallic surfaces. When the egg material is reduced to a colloidal or homogeneous state, it may be raised to a sufficient temperature for a sufficient time by a vaporous heating medium such as steam to kill or render substantially impotent all pathogenic organisms and undesirable bacteria without impairing the functional properties of any part of the egg material. The process is thus capable of producing an acceptable product on a physical basis with a higher degree of sterility than is required in the industry since for commercial purposes a low bacterial count is acceptable.

For example, commercial users require that the bacteria count must not exceed a specified number per cubic centimeter of product, the actual value depending upon the standards of the user and the product in which the eggs are to be used, such as pies, custards, mayonnaise, etc. Untreated eggs at 55° F. when broken may have a count which is larger or smaller than the specified value, making it difficult to obtain acceptable eggs in the first place. Then, hours later, when the eggs are stored at 40° F., the bacteria count may increase to an unacceptable value, as for instance 400,000 per cubic centimeter of product. With the present process, using eggs having a bacteria count of 400,000, the count is reduced to less than 200. With such a low bacteria content the processed eggs can be stored for months without any increase in bacteria. Tests have shown no increase after storage for more than six months.

As another example, when ordinary untreated eggs are used in a product such as pies, the maximum storage of the pies is less than four days before degeneration of the product occurs. However, when such pies are made with the processed eggs of the present invention, the pies have been stored for more than two weeks without objectionable degeneration occurring.

As the process is disclosed herein, no additives are necessary. The process does, however, permit the inclusion of certain additives, such as sugar and salt, for the purpose of enhancing the taste and flavor of the product, and the special considerations and requirements attending the use of such seasonings will be explained for the purpose of meeting the varying demands of the trade.

The reduction of whole egg material to a state of fine dispersion by a homogenizer or other equivalent device capable of so reducing the egg material takes maximum advantage of certain bacteria inhibiting substances which are already present in eggs. Such substances are found in the whites and chiefly in the chalazae which are dense cord-like strands of white material, one on each side of the yolk, which anchor the yolk near the center of the egg. Being dense, the chalazae are not broken down readily when the egg is beaten or pumped through ordinary pumping equipment. However, in accordance with the present invention, when the chalazae are reduced to a fine dispersion along with the rest of the egg material, the bacteria inhibiting substances therein are made available to the whole egg material.

The removal of objectionable flavors and odors is based on the recognition that such flavors and odors are contained in esters and the discovery that these esters in eggs are volatile at elevated temperatures in a vacuum after the egg material has been reduced to a state of fine dispersion approximating a colloidal state. These esters are associated with the fats in the egg and are not readily dissociated therefrom. The dispersion treatment, however, appears to reduce the association to a simple suspension whereby the esters are volatilized and withdrawn by a vacuum pump. In the pasteurization processes heretofore attempted on eggs without additives or homogenization, the necessary volatilizing temperature for effective odor removal was not attainable without impairing the functional properties of the egg material.

Description of the Plant

In FIGURE 1 the raw product inlet line 10 leads into a suitable refrigerated storage tank 11 which is preferably equipped with a propeller type stirrer, not shown, to provide sufficient agitation to prevent the heavier components from separating from the lighter components. The egg material flows from the bottom of the tank through a pipe 12 equipped with a valve 13. Pipe 12 delivers the material to the intake side of a pump 14. The motor drive for this pump is equipped with a speed regulating device 15 for changing the pump's rate of delivery through an operating range as may be desired.

The output of pump 14 is delivered through a pipe 16 to a regenerator section 24 of a plate type heat exchanger 25 for pre-heating. After pre-heating, the material flows through pipe 21 to a homogenizer 22. From the homogenizer the material flows through a pipe 23 to the heated section 26 of the plate heat exchanger 25 which is heated by a hot water supply line 27. The used hot water is recirculated through another connection, not shown.

Pipe 28 leads to a holder tube assembly 30. The discharge end of holder tube assembly 30 is connected with a flow diversion valve 31 having a main flow discharge pipe 32 and a diversion flow pipe 33 leading back to pipe 12 at the intake to pump 14. Diversion valve 31 is responsive to the temperature of the material entering from holder tube assembly 30. When this temperature falls below a predetermined value, the valve temporarily shunts the entire flow back through pipe 33 for re-heating. As long as the temperature of the material remains above the predetermined value, the entire flow is passed on through pipe 32 to a pressure regulator or check valve 34. This valve maintains a predetermined pressure in pipe 32 and the diversion valve 31 to keep the holder tube assembly 30 full of material at all times and to return the diversion flow back through pipe 33 against the pressure head in tank 11 at times when the flow is diverted by diversion valve 31 as described.

From pressure regulator valve 34 the material flows through pipe 35 to a tangential side inlet near the top of a first vacuum chamber 40. From the vacuum chamber 40, which is merely an unheated tank, the material discharges by gravity from a bottom outlet and proceeds through a pipe 41 having an upturned U-bend 42 to a pump 43. The top of the U-bend 42 forms a trap to maintain a corresponding liquid level in tank 40 as will be explained.

Pump 43 discharges through pipe 44 and pressure regulating or check valve 45 into the top of steam infusion heater 50. Steam is supplied to this heater through steam supply line 51 under the control of a pressure regulating valve 52. Adjustment of this valve provides temperature regulation for the steam treatment administered to the product in the infusion heater 50. This steam infusion heater is a chamber or tank which will be described in detail with reference to FIGURE 3.

Pipe 53 connects the bottom of steam infusion heater 50 with a tangential side inlet near the top of a second vacuum chamber 55. Pipe 56 carries the material by gravity flow from the bottom of this vacuum chamber to a pump 57, which preferably is of the positive type, from whence it is delivered through a pipe 58 and pressure regulator valve 59 which adjusts the flow to the regenerator section 24 of plate heat exchanger 25. The hot product from pipe 58 proceeds through the regenerator section 24 in heat exchange relation to the relatively cooler material arriving from pipe 16 whereby the former transfers heat to the latter to reduce the temperature of the material from pipe 58 and increase the temperature of the material from pipe 16. Thus, by bringing these two flows of material into heat exchange relation with each other, the regenerator section 24 serves as an economical pre-heater for the material from pipe 16 and a pre-cooler for the material from pipe 58 without mixing the two flows.

A final plate cooler 60 further cools the product to the desired end temperature, receiving the material through pipe 61 from regenerator section 24 and delivering the material through pipe 62 to the storage tank 63 designated in FIGURE 2. The first section of plate cooler 60 may be cooled by a well water supply pipe 64 while the second section is preferably cooled to a lower temperature by a refrigerated water supply pipe 65. There are also provided water disposal pipes, not shown.

The process steps in the flow chart of FIGURE 2 are designated by the numerals and names applied to the different items of equipment in FIGURE 1 which carry out the process steps and assist in handling the product flow. Thus, the regenerator section 24 of plate heat exchanger 25 appears first in FIGURE 2 as a heater and later as a cooler since it functions first as a pre-heater for the incoming material and later as a pre-cooler for the outgoing product.

Reduced pressure is maintained in the vacuum chambers 40 and 55 and steam infusion chamber 50 by a pair of vacuum pumps 71 and 72. Vacuum line 73 connects pump 71 with the top of vacuum chamber 40 while the branch line 74 connects with the pipe 41 at the top of the U-bend 42.

A vacuum line 76 connects the suction side of a vacuum pump 72 with a condensing chamber 77. The top of condensing chamber 77 is connected by a suction or vacuum line 78 with the top of vacuum chamber 55. Steam, water vapor and volatile substances from the eggs are thereby removed from vacuum chamber 55 and condensed in chamber 77.

The numeral 80 designates a condensate pump. The suction side of this pump is connected by a pipe 81 with the bottom of condensing chamber 77. The discharge sides of all three pumps 71, 72 and 80 are connected with independent disposal lines 82.

Numerals 85 to 88 designate, respectively, a vacuum controller and recorder for the vacuum lines 73 and 76, a hot water temperature controller and recorder for the hot water line 27, a temperature controller and recorder for diversion valve 31 and a controller and recorder for the steam infusion heater 50 operable on the steam regulating valve 52.

A preferred form of steam infusion chamber 50 is shown in FIGURES 3 and 4. The chamber 50 comprises a vertical elongated metal cylinder 100 which is closed at its lower end by a lower head 101 and closed at its upper end by an upper head 102. The ends of the cylinder are equipped with peripheral flanges 103 and the heads are equipped with corresponding peripheral flanges 104, these flanges having conical mating surfaces which form an airtight joint sealed by ring gaskets 105. The flanges are clamped together by clamp rings 106 to facilitate removal of the heads for cleaning.

The cylinder 100 is equipped near its lower end with a side connection 107 for the steam pipe 51 in FIGURE 1 and the bottom head 103 is equipped with a T product discharge connection 108 which is connected with the pipe 53 in FIGURE 1. The tank is supported on this discharge connection by means of a standard 109 having a base 110. The other side of the T connection can be used for the insertion of a thermometer, if desired, for measuring the temperature of the outgoing product.

The upper head 102 carries a product inlet pipe 115 which is connected at its upper end with the pipe 44 in FIGURE 1. Pipe 115 extends vertically downwardly through the center of the cylinder to a point a short distance above the steam inlet connection 107. The pipe is provided with a plurality of upper discharge openings 116 and a plurality of lower discharge openings 117. Surrounding the upper discharge openings 116 is a large cup 118 having a bottom opening to fit the exterior of the pipe, the bottom edge of the cup about this opening being supported on a snap ring 119 which is seated in a groove in the pipe just below the openings 116. Resting on the upper edge of cup 118 above the openings 116 is a flat metal plate 120 having a central opening to fit loosely about the pipe 115, this plate being somewhat larger in diameter than the cup to overhang the upper edge of the cup as shown.

The lower end of pipe 115 is closed by a plug 125 which is equipped with an annular groove 126 to receive the spring legs of a hairpin-type wire retainer 127. Vertical movement of the plug and retainer are prevented by horizontal slots 128 in opposite sides of pipe 115 which receive the legs of the retainer as shown in FIGURE 4. The size of the orifices formed by openings 117 may be varied by installing plugs of different lengths to cover the lower portions of these openings as shown in FIGURE 3.

A small cup 130 rests on retainer 127 with its upper edge above the level of openings 117 and a plate 131 rests loosely on the upper edge of the cup with its outer edge overhanging the edge of the cup. Plate 131 is thicker and, consequently, heavier than the upper plate 120. By reason of the form of construction and assembly just described, the plug 125 is readily removable after which the cups and plates may be withdraw from the lower end of pipe 115 for convenience in individually washing and cleaning all of the separate parts.

Plates 120 and 131 form check valves to prevent steam from backing up in pipes 115 and 44 and tend to keep these pipes completely filled with liquid product being pumped into the steam infusion chamber. The product is discharged into the chamber in a curtain-like spray of umbrella shape from each cup against the walls of the chamber so as to intimately mix and diffuse the product with the steam entering the chamber through the inlet 107.

The extra weight in the lower plate 131 tends to equalize the discharge from the two cups so that the lower cup will not discharge faster than the upper cup by reason of the difference in elevation between the two cups. The discharge from the two cups in part falls through the steam atmosphere to the bottom of the tank and in part impinges upon the tank wall and runs down to the bottom of the tank, the liquid product in both cases being exposed to the steam atmosphere throughout such descent, causing the product to be heated rapidly and causing some of the steam to be condensed into water. If it is desired to accomplish complete condensation of steam in the chamber, it may be advisable to maintain pressure within the chamber above the corresponding boiling point of the product being treated. A regulated pressure source of suitable gas can be introduced in the upper portion of the chamber for this purpose. The mixture of liquid product, condensed steam and uncondensed steam is withdrawn from the bottom of chamber 50 by the vacuum in chamber 55 at a rate fast enough to prevent accumulation or lingering of the product in the bottom of the chamber 50.

In order to maintain substantially steady flow of the material throughout the system and to reduce the tendency for the material, particularly in the case of egg whites, to foam and surge under certain conditions, positive gear type pumps are preferred for the pumps 14, 43 and 57. Pumps suitable for this purpose are shown in the patent to Devlin No. 2,567,699 and the patent to Wakeman No. 2,848,952.

The plate heater 25 and the cooler 60 are preferably of the type used in the dairy industry. Suitable heat exchangers are illustrated, for example, in the Wakeman Patents No. 2,777,674 and No. 2,790,627.

The homogenizer 22 is preferably of a type used for homogenizing milk and cream. Examples of suitable equipment for the present purpose are to be found in the Hanson Patents No. 2,304,689 and No. 2,748,802 and the Wakeman Patent No. 2,901,981. A plate type orifice valve may be more desirable than the multi-orifice valve shown in these patents. However, the results of breakup of the fat particles must be comparable.

The pumping, heating and cooling and homogenizing components, as well as the piping, valves and tanks, used in the dairy industry are well suited for the present purpose because they of necessity employ non-corrodable materials in contact with the product and are designed for convenience in being taken apart and thoroughly cleaned. Thus, this essential requisite of the food industry in general dictates the preferred types of equipment which are practical in a commercial operation, although it is to be understood that the practice of the invention is not limited to the specific types of equipment illustrated in the patents and particular examples referred to. For example, centrifugal pumps may be substituted for one or more of the present positive feed pumps in any part of the system where no trouble is experienced from foaming and surging. Also, for the purpose of reducing the egg material to a state of fine dispersion, other types of equipment such as a colloidal mill, hammer mill or clarifier may be substituted for the present homogenizer. A homogenizer is preferred because of its simplicity, lower cost and greater familiarity to workers in the dairy industry.

The Treatment of Whole Eggs

The process will first be described in connection with the treatment of whole eggs. The shells having been removed, the whole egg material is delivered through pipe 10 to a storage tank 11 which is preferably maintained at a temperature between 33° and 38° F. Settling or stratification of the materials of different densities is prevented by the agitator. This agitator performs no function in the present process except to keep the different constituents of the egg material thoroughly mixed so that the material delivered through outlet pipe 12 will always be whole egg material and standardized solids.

Homogenizer 22 serves as a timing pump for the whole process. The speed of the homogenizer is adjusted to maintain the desired rate of steady flow of the material through pipe 23 and plate regenerator 24. The regenerator 24 raises the temperature of the chilled material to a value in the range of approximately 90° to 130° F. for the most effective operation of the homogenizer 22, at which temperature the fats are free flowing.

In homogenizer 22 the whole egg material is reduced to a state of fine dispersion which may be described as a colloidal state, or approximately colloidal state. After being reduced to such a state of fine dispersion, the egg material is of a homogeneous character wherein it does not exhibit any tendency toward separation or stratification of the different constituents having different specific gravities.

The homogenizer breaks up the normal fat globules into smaller particles and effects a uniform colloidal type of dispersion of the fats within the whole egg material. In this connection is it pointed out that substantially the entire fat content of an egg is concentrated in the yolk, the latter containing approximately one-third fats while the egg white or albumen contains approximately 0.2% fat. On the other hand, the protein content of an egg is more equally divided, the yolk containing about 16% proteins and the white about 12%. Another function of the homogenizer is to reduce these protein materials likewise to smaller particle size and effect uniform colloidal dispersion thereof within the egg material which is predominantly water, the yolk being about half water and the white being approximately 86% water. The breaking up of the fat and protein materials and the creation of a uniform dispersion of these materials is facilitated by the mildly elevated temperature produced by regenerator 24 which makes the egg yolk fat free flowing. Homogenization at such temperature prevents the separation of the fat particles when the liquid material is in a quiescent state.

Previous attempts to pasteurize egg materials have been successful only to the extent of killing certain bacteria and organisms while being unable to kill others that can withstand higher temperatures. It is believed that the reason for this is that the natural fat globules and possibly also the protein particles, although actually quite small, are still big enough to resist and retard sufficiently rapid heat penetration into these solids to kill the more resistant types without producing undesirable coagulation and denaturation of the egg material. It is believed that the breaking down of these solids in the present process to a finer particle size and, particularly, the fat globules, increases the rate of heat penetration into the solids to the point where even the most heat resistant bacteria and organisms are killed before there is sufficient time for coagulation to occur. It is known that coagulation of proteins is a function of both time and temperature, coagulation progressing rapidly at high temperatures and relatively slower at lower temperatures. Coagulation is not a phenomenon which occurs instantaneously at some critical temperature within the range involved in the present process.

It is also known that the egg white, or albumen, coagulates at a lower temperature than the protein in the yolk. It is believed that this is due to the large protective fat content of the yolk in contrast to the almost negligible fat content of the white. By reducing the normal fat globules in the present process to a state of fine dispersion throughout the whole egg material the proteins in the white are apparently protected in the same manner as the proteins in the yolk and the coagulation temperature of the white is raised to such an extent that the permissible maximum temperature for the whole egg material is raised to the same value as that which may be applied to the yolk alone. Thus, after homogenization, the whole egg material will safely withstand a pasteurizing temperature applied in accordance with the present process. In the present process the heat is applied in a different way and by a different medium than has heretofore been used for egg material.

Breaking up of the fat globules as above described also facilitates release of off odors from esters under vacuum in subsequent treatment steps. The pump 14 itself reduces the eggs to a uniform liquid mass but the break-up of the fat globules is not complete. Substantially complete inhibiting action to denaturation is obtained when an homogenizer or other colloidal machine is used.

Leaving the homogenizer, the material is then heated to a temperature of approximately 143° F. in the plate heater section 26. The temperature here is held within the narrow range of approximately 140° to 144° F. to avoid any alteration of the natural characteristics of the egg material, or denaturation, by contact with the hot metallic plates, though actual coagulation would not start until a somewhat higher temperature was attained.

Leaving the plate heater, the material flows through holding tube section 30 to flow diversion valve 31. Holding the tube section 30 is a pipe of sufficient length to hold the flowing liquid at a temperature of about 143° F. for approximately thirty seconds.

Flow diversion valve 31 is a thermostatic valve operating in response to the temperature of the material to pass the material on to pipe 32 when it registers a predetermined temperature, such as 143° F. in the case of the present example. When the temperature of the material falls below such predetermined value, the valve 31 automatically stops the flow through pipe 35 and diverts the flow through pipe 33 back to pump 14 for re-circulation and re-heating through the heat exchanger 25. Pressure regulator valve 34 maintains a predetermined back pressure to keep the holding tube section 30 full and produce the diversion or feed back flow. This is a differential or check valve for maintaining pressure on one side, in pipe 32, and vacuum on the other side, in pipe 35.

Thus, the egg material is delivered to vacuum chamber 40 at a temperature of 143° F. for a first removal of the volatile esters containing objectionable flavor and odor characteristics. Vacuum line 73 communicating with the top of this chamber maintains a sub-atmospheric pressure in the chamber of approximately 24 inches of mercury vacuum or 6 inches of mercury absolute pressure. The liquid enters the tank tangentially near the top and flows around the inside surface in a thin sheet, the vacuum being regulated to cause the incoming liquid to boil for only a short time after entry. The liquid discharges from the bottom of the tank by gravity through pipe 41, the upturned U-bend 42 forming a trap to maintain a predetermined liquid level in the tank. This liquid level is such as to produce a holding time of about three minutes in the vacuum tank. In other words, from the time an increment of liquid enters the tank to the time it is discharged is about three minutes. For example, at a product rate of 5000 pounds per hour the desired holding time is established by maintaining 30 gallons of liquid in the tank. This liquid is at a temperature not less than 140° F. and the vacuum should not be low enough to cause the whole mass to boil.

Pump 43 then pumps the material through regulating valve 45 and pipe 44 to the top of steam infusion heater 50 where the egg material enters a live steam atmosphere supplied by steam line 51 under the control of steam regulating valve 52. Valve 45 is simply a check valve in the line between vacuum chamber 40 and steam infusion chamber 50. In a typical installation, for example, having a product rate of 5000 pounds per hour, steam supply line 51 adds approximately 100 pounds of steam per hour which is regulated by valve 52. Most of this steam condenses and passes with the egg material through pipe 53 to the upper portion of a second vacuum chamber 55. Pipe 53 is sized so as to provide a restriction to maintain a pressure differential between chambers 50 and 55. A vacuum line 78 leads from the top of vacuum chamber 55 to condensing chamber 77 whereby vacuum chamber 55 is maintained under a vacuum of approximately 24 inches of mercury or six inches of mercury absolute presure. This vacuum is adjusted to maintain a temperature of 140° F. in chamber 55 by vaporization of esters and condensate.

Thus, in vacuum chamber 55 additional volatile esters are removed and also a certain amount of water vapor. Preferably, the vacuum maintained in chamber 55 is adjusted so that the rate of water vapor removal from both vacuum chambers 40 and 55 is equal to the rate at which water vapor is added in the form of steam from steam line 51. The egg material leaving chamber 55 then has the same water content as the original material whereby there is no loss or gain of any material in the present process except the volatile esters. The water vapor and volatile esters which are removed as above described are eliminated from the system by means of vacuum or suction lines 76 and 81 connected with condensing chamber 77 and the ultimate discharge or disposal pipes 82.

Vacuum line 78 communicates indirectly with steam infusion chamber 50 through the pipe 53 to maintain a vacuum of approximately ten inches of mercury or twenty inches absolute in infusion chamber 50. The difference in pressure between tanks 50 and 55 provides the motive power for pulling the product as well as the steam and condensate from infusion chamber 50 into vacuum chamber 55. The steam line supplying regulator valve 52 contains saturated steam at, or slightly above, atmospheric pressure. The steam is admitted in sufficient volume to raise the temperature of the egg product to approximately 158° F. in steam infusion chamber 50. The full range of operating temperature is preferably between 155° and 165° F.

For example, in a particular installation, saturated steam at about 250° F. is supplied ahead of steam regulator valve 52 and is admitted in sufficient volume to raise the temperature of the eggs from 140° F. to 158° F. while passing through the infuser chamber in an atmosphere at a pressure of about 10 inches of mercury vacuum. When the temperature is held between 158° F. to 160° F., the eggs are pasteurized to a bacteria count of about 200 per cubic centimeter with no objectionable denaturation occurring.

This temperature range is somewhat above the generally accepted value at which yolks, or mixed yolks and whites, normally begin to coagulate on a hot metallic surface. It is found, however, that such egg materials will withstand these temperatures in the present process without coagulation or denaturation. When the fats and proteins are broken up and finely dispersed and when such fine dispersion is discharged into a steam atmosphere in the absence of hot metallic surfaces, a large liquid surface is presented to the heating medium for rapid heat transfer. Since the liquid egg is already at a temperature of at least approximately 140° F., it does not have a great chilling effect on the heating medium. Maximum advantage is thereby taken of the latent heat of vaporization of the steam which transfers its heat directly to the egg discharge substantially instantaneously upon contact therewith, some of the steam condensing on the egg droplets themselves. The slight distance the heat must travel from the surface of each droplet of egg material to its center overcomes the temperature gradient problem encountered in pasteurizing with plate heaters even when the material is passed between the hot plates in a relatively thin film. With such rapid and uniform heating of the egg material, the time and temperature controls can be precise and are significant with respect to all particles in the treated material, some particles not being heated hotter or longer and thus subject to incipient coagulation or denaturation and other particles not being heated sufficiently or too briefly and thus not pasteurized as to certain organisms.

The material passes through steam infusion heater 50 rapidly, being drawn into chamber 55 through pipe 53 so that the duration of the steam treatment in chamber 50 is about one second. If a longer treatment time is desired, a holder tube as at 30, of appropriate length, may be connected at the outlet of chamber 50.

The material then remains for an interval of about six seconds in vacuum chamber 55 during which time it is cooled to 140° F., as explained above, and additional objectionable flavors and odors are removed from esters that did not volatilize in vacuum chamber 40 prior to the steam treatment. Evaporation and removal of the condensate by the vacuum pump reduces the temperature in chamber 55 about 10° F. for every 50 pounds of condensate removed per hour. The material enters the tank of chamber 55 tangentially near the top as in tank 40 and is continuously removed at the bottom with no appreciable delay or hold beyond that required for cooling, as described.

Pump 57 removes the material from vacuum chamber 55 through pipe 56 and delivers it through check valve 59 which prevents back flow into chamber 55. The material is thereby conveyed back to the regenerator section 24 of plate heater 25 where the heat of the material from pipe line 58 is used to preheat the cold material arriving from the tank in pipe 16. Regenerator section 24 thus constitutes a pre-cooler for the material in pipe 58 and a pre-heater for the material in pipe 16. Regenerator section 24 cools the material arriving from pipe 58 to a temperature in the range of 120° to 130° F. The flow of the material from the time it first contacts live steam in infusion heater 50 to the time it reaches regenerator section 24 covers a time interval of from eight to ten seconds.

From regenerator section 24 the material proceeds through pipe 61 to plate cooler 60 which reduces the temperature preferably to approximately 38° F. The product should be cooled to below 40° F. within twenty seconds after leaving vacuum chamber 55. Pipe 62 leads to a final storage tank as indicated at 63 in FIGURE 2. The egg material thus treated may be kept in a refrigerated liquid condition, it may be frozen or it may be dried according to conventional processes. It may also be partially frozen in a slusher, if desired.

The process just described has been carried out in a plant as shown in FIGURE 1, having a capacity of 5000 pounds per hour, by way of example. The egg material is in process in substantially continuous flow not over five minutes from tank 11 to tank 63.

*Other Egg Products*

The present process may also be employed in connection with the following products which are in demand in the egg industry: whole eggs salted, whole eggs sugared, egg yolks, egg yolks salted, egg yolks sugared, and egg whites.

When salt or sugar is added for seasoning, no change in the process is required to handle most of the above-named products. Salt may be added to whole eggs, either before or after the present process, provided that the salt is bacteria-free. If the salt is contaminated, it must, of course, be added before processing but no change in the process is necessary.

The bacteria content of sugar, on the other hand, generally requires its addition to the egg product before processing. No special problems are presented by the addition of sugar to either whole eggs or egg yolks. The processing temperatures do not cause crystallization or caramelization of the sugar content.

Egg yolks without salt or sugar are treated the same as whole eggs.

The addition of salt to egg yolks, however, must be carried out after the present processing because of reaction of the salt with the very high fat and solids contents of the egg yolk. The salt is preferably added while the product is at a temperature of 120 to 130° F., just prior to final cooling in cooler 60, as a matter of convenience in dissolving the salt. Obviously, contaminated salt cannot be used at this stage in the process as that would amount to inoculating a favorable medium for the growth of bacteria.

When certain additives such as sugar and salt are introduced after the heat treatment, a second homogenization or similar type of agitation in a separate machine is very helpful after the egg material is discharged from the second vacuum chamber 55, and after the additive has been introduced but prior to cooling. This additional agitation produces a more uniform product and facilitates the cooling of the treated product when plate heat exchangers are used as indicated at 24 and 60.

Egg whites require a variation in the process. The egg whites are pumped directly from pump 14 into plate heater sections 24, 26 where they are heated to 128° F. to avoid denaturation, bypassing the homogenizer 22. The steam infuser temperature at 50 is reduced to 143 to 145° F. with the treatment time not exceeding six seconds in both the steam infuser and second vacuum chamber 55. This lower temperature is effective to pasteurize egg whites because of certain bacteria inhibiting factors which are present in the whites as pointed out above and which can be taken advantage of with good results. In vacuum chamber 55 the whites are reduced to 128° F., or lower, and then in the heat exchangers 24 and 60 the product is quickly cooled below 40° F.

Having now described our invention and in what manner the same may be used, what we claim as new and desire to protect by Letters Patent is:

1. The method of treating a shelled egg product without coagulating the same comprising pre-heating the egg product to a temperature within the range of approximately 90° F. to 130° F. until the fats therein are free-flowing, reducing the egg product to a state of fine dispersion, heating said dispersion to a pasteurizing temperature within the range from approximately 140° F. to 165° F., and holding the dispersion at said temperature to destroy substantially all pathogenic bacteria contained in the egg product.

2. The method of treating a shelled egg product without coagulating the same comprising pre-heating the egg product to a temperature within the range of approximately 90° F. to 130° F. until the fats therein are free-flowing, reducing the egg product to a state of fine dispersion, heating said dispersion to a pasteurizing temperature within the range from approximately 140° F. to 165° F., holding the dispersion at said temperature to destroy substantially all pathogenic bacteria contained in the egg product and subjecting the egg product to a sub-atmospheric pressure for about six seconds to remove such off odors and volatile esters from the product as will volatile at such sub-atmospheric pressure.

3. The method of treating a shelled egg product without coagulating the same comprising pre-heating the egg product to a temperature within the range of approximately 90° F. to 130° F. until the fats therein are free-flowing, reducing the egg product to a state of fine dispersion, heating said dispersion to a pasteurizing temperature within the range from approximately 140° F. to approximately 165° F., said heating including the step of spraying the egg product through an atmosphere of steam, and holding the dispersion at said temperature to destroy substantially all pathogenic bacteria contained in the egg product.

4. The method of treating a shelled egg product without coagulating the same comprising pre-heating the egg product to a temperature within the range of approximately 90° F. to 130° F. until the fats therein are free-flowing, reducing the egg product to a state of fine dispersion, heating said dispersion to a pasteurizing temperature within the range from approximately 140° F. to approximately 165° F., said heating including the step of spraying the egg product through an atmosphere of steam, subjecting said dispersion to a sub-atmospheric pressure to remove all of the steam condensate that enters the dispersion during the period the same is being heated by the steam.

5. The method of treating a shelled egg product without coagulating the same comprising pre-heating the egg product to a temperature within the range of approximately 90° F. to 130° F. until the fats therein are free-flowing, reducing the egg product to a state of fine dispersion, heating said dispersion to a temperature within the range from approximately 140° F. to 144° F., holding the dispersion at such a temperature for about thirty seconds, spraying the egg product through an atmosphere of steam to raise the temperature to within the range of approximately 155° F. to 165° F., holding the dispersion at said temperature to destroy substantially all pathogenic bacteria contained in the egg product, and removing the steam condensate that enters the dispersion during the period the same is being heated by the steam.

References Cited in the file of this patent

UNITED STATES PATENTS

| | | |
|---|---|---|
| 2,093,786 | Swarthout et al. | Sept. 21, 1937 |
| 2,473,041 | Urbain et al. | June 14, 1949 |
| 2,565,311 | Koonz et al. | Aug. 21, 1951 |
| 2,669,518 | Torr | Feb. 16, 1954 |
| 2,776,214 | Lloyd | Jan. 1, 1957 |
| 2,919,639 | Cronin | Jan. 5, 1960 |
| 2,936,240 | Kaufman et al. | May 10, 1960 |